US012675938B2

(12) United States Patent
Huo et al.

(10) Patent No.: US 12,675,938 B2
(45) Date of Patent: Jul. 7, 2026

(54) METHODS AND SYSTEMS FOR TEXT-GUIDED 3D TEXTURE GENERATION

(71) Applicants: Dong Huo, Montreal (CA); Xinxin Zuo, Montreal (CA); Zhihao Shi, Montreal (CA); Peng Dai, Montreal (CA); Juwei Lu, North York (CA); Songcen Xu, Shenzhen (CN)

(72) Inventors: Dong Huo, Montreal (CA); Xinxin Zuo, Montreal (CA); Zhihao Shi, Montreal (CA); Peng Dai, Montreal (CA); Juwei Lu, North York (CA); Songcen Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 154 days.

(21) Appl. No.: 18/675,697

(22) Filed: May 28, 2024

(65) Prior Publication Data

US 2025/0371790 A1    Dec. 4, 2025

(51) Int. Cl.
    *G06T 15/04*    (2011.01)
    *G06F 40/40*    (2020.01)
    *G06T 17/20*    (2006.01)

(52) U.S. Cl.
    CPC .............. *G06T 15/04* (2013.01); *G06F 40/40* (2020.01); *G06T 17/20* (2013.01)

(58) Field of Classification Search
    CPC .......... G06T 15/40; G06T 17/20; G06F 40/40
    USPC ....................................... 345/419
    See application file for complete search history.

(56) References Cited

U.S. PATENT DOCUMENTS

2025/0191273 A1* 6/2025 Korolev ................. G06T 15/04

OTHER PUBLICATIONS

Zhang et al. "Adding Conditional Control to Text-to-Image Diffusion Models", Year 2023, Proceedings of the IEEE/CVF International Conference on Computer Vision, 2023, pp. 3836-3847. arXiv:2302.05543; (Year 2023).*
Richardson, et al. "TEXTure: Text-Guided Texturing of 3D Shapes", Year 2023, SIGGRAPH '23 Conference Proceedings, Aug. 6-10, 2023, Los Angeles, CA, USA, arXivpreprint, arXiv: 2302.01721, (Year 2023).*
Poole B, Jain A, Barron JT, Mildenhall B. DreamFusion: Text-to-3D using 2D Diffusion. Inthe Eleventh International Conference on Learning Representations Sep. 29, 2022.

(Continued)

*Primary Examiner* — Hai Tao Sun

(57) ABSTRACT

System, method, and computer readable medium for generating a 3D texture for a 3D object are disclosed. A 3D mesh and a text prompt for a desired texture are obtained. A sequence of texture sampling steps is performed, where each given texture sampling step includes iterating over a plurality of 2D views of the 3D mesh to generate an intermediate texture map. For a given iteration, a given 2D view and the text prompt are processed using a pre-trained 2D image generation diffusion model to fill in a portion of an intermediate texture map based on the given 2D view. A noise estimation generated by the diffusion model is refined, adding the intermediate texture map as guidance, to generate a latent variable to be inputted to a subsequent texture sampling step, enabling generation of a 3D texture, based on a text prompt, with fewer artifacts.

20 Claims, 6 Drawing Sheets

(56)                    References Cited

OTHER PUBLICATIONS

Chen R, Chen Y, Jiao N, Jia K. Fantasia3d: Disentangling geometry and appearance for high-quality text-to-3d content creation. arXiv preprint arXiv:2303.13873. Mar. 24, 2023.

Wang Z, Lu C, Wang Y, Bao F, Li C, Su H, Zhu J. ProlificDreamer: High-Fidelity and Diverse Text-to-3D Generation with Variational Score Distillation. arXiv preprint arXiv:2305.16213. May 25, 2023.

Richardson E, Metzer G, Alaluf Y, Giryes R, Cohen-Or D. Texture: Text-guided texturing of 3d shapes. arXiv preprint arXiv:2302.01721. Feb. 3, 2023.

Chen DZ, Siddiqui Y, Lee HY, Tulyakov S, Nießner M. Text2tex: Text-driven texture synthesis via diffusion models. arXiv preprint arXiv:2303. 11396. Mar. 20, 2023.

Cao T, Kreis K, Fidler S, Sharp N, Yin K. Texfusion: Synthesizing 3d textures with text-guided image diffusion models. InProceedings of the IEEE/CVF International Conference on Computer Vision 2023 (pp. 4169-4181).

Zhang et al. Proceedings of the IEEE/CVF International Conference on Computer Vision, 2023, pp. 3836-3847. arXiv:2302.05543.

Rombach et al. Proceedings of the IEEE/CVF Conference on Computer Vision and Pattern Recognition (CVPR), 2022, pp. 10684-10695. arXiv:2112.10752.

Cao et al. MasaCtrl: Tuning-Free Mutual Self-Attention Control for Consistent Image Synthesis and Editing, arXiv:2304.08465 Apr. 17, 2023.

Brooks et al. InstructPix2Pix: Learning to Follow Image Editing Instructions, arXiv:2211.09800 Nov. 17, 2022.

* cited by examiner

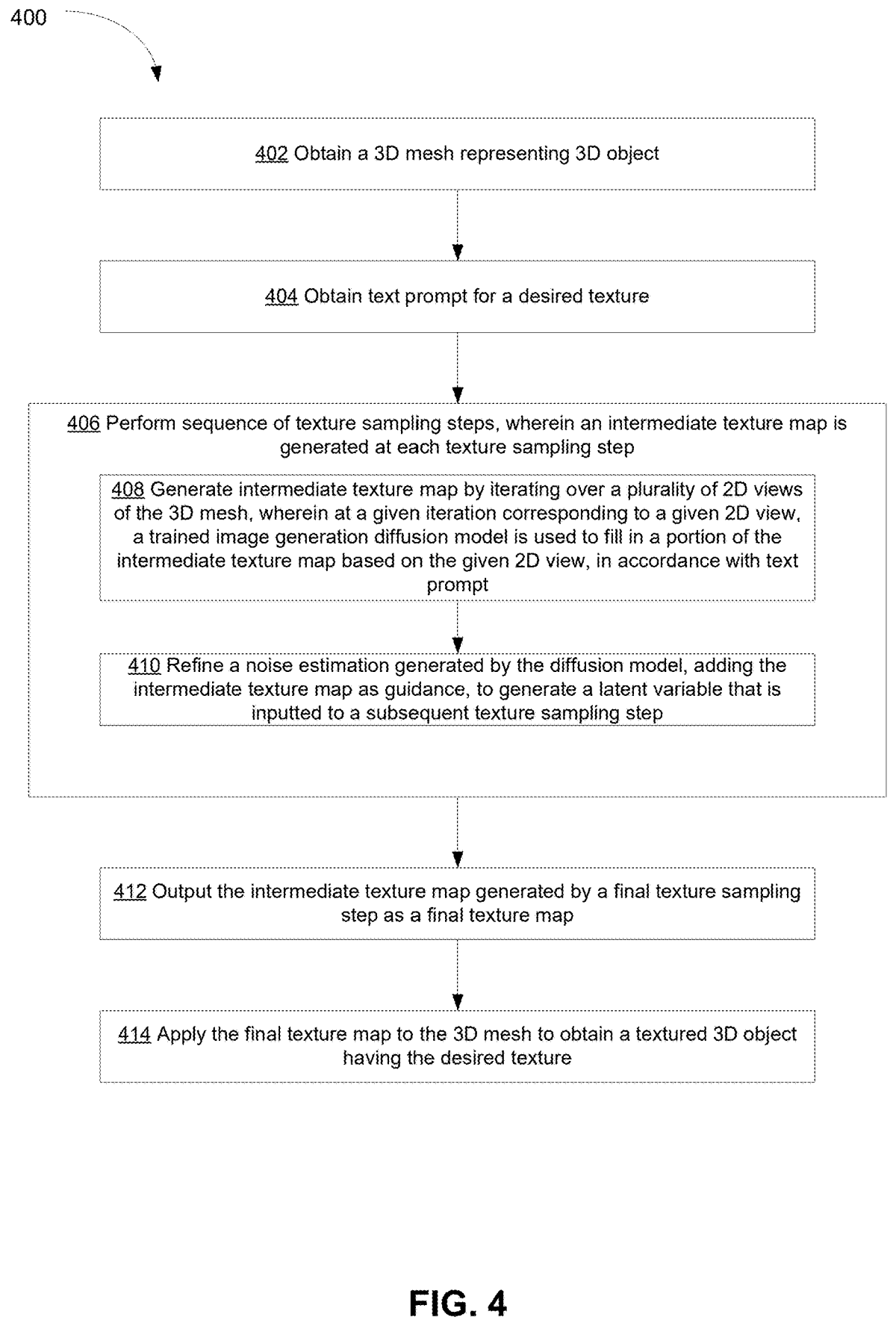

400

402 Obtain a 3D mesh representing 3D object

404 Obtain text prompt for a desired texture

406 Perform sequence of texture sampling steps, wherein an intermediate texture map is generated at each texture sampling step

408 Generate intermediate texture map by iterating over a plurality of 2D views of the 3D mesh, wherein at a given iteration corresponding to a given 2D view, a trained image generation diffusion model is used to fill in a portion of the intermediate texture map based on the given 2D view, in accordance with text prompt

410 Refine a noise estimation generated by the diffusion model, adding the intermediate texture map as guidance, to generate a latent variable that is inputted to a subsequent texture sampling step

412 Output the intermediate texture map generated by a final texture sampling step as a final texture map

414 Apply the final texture map to the 3D mesh to obtain a textured 3D object having the desired texture

FIG. 4

METHODS AND SYSTEMS FOR TEXT-GUIDED 3D TEXTURE GENERATION

RELATED APPLICATIONS

This is the first application for this matter.

FIELD

This disclosure relates to a system, methods and computer readable medium for generating a texture map for a 3D model, including system, methods and computer readable medium based on text-to-image diffusion models.

BACKGROUND 3D digital content has been in high demand for a variety of applications, including augmented reality (AR) applications, virtual reality (VR) applications, gaming, entertainment, architecture, and robotics simulation, among others. There is growing interest in using 3D digital content in almost all domains, including retail, online conferencing, virtual social presence, education, etc. Existing approaches to 3D synthesis have typically focused on the geometric components of 3D assets. Textures have garnered less attention.

Accordingly, there is a need for an improved system, method, and computer readable medium for 3D texture generation.

SUMMARY

In various examples, the present disclosure describes methods, systems and computer readable media that enable automatic text-driven 3D texture generation for 3D meshes (e.g., any arbitrary 3D mesh for any arbitrary 3D model). Examples of the present disclosure may enable generation of a 3D texture, based on a text prompt, with fewer artifacts (such as over-saturation, over-smoothing, visible seams, etc.) compared to some existing 3D texture generation approaches (e.g., by ensuring the texture generated for a given view of the 3D mesh is consistent with that previously generated for another view of the 3D mesh, such as by using attention-guided sampling, as discussed further below). This may provide a technical advantage in that higher quality 3D textures may be generated for 3D meshes, which may enable higher quality (e.g., more realistic) 3D models to be rendered, based on a text prompt. Examples of the present disclosure may provide technical advantages in various applications where 3D digital content may be used, such as in AR or VR applications, gaming, simulations, digital entertainment, etc. Examples of the present disclosure may be adapted for editing of an existing 3D texture, based on a text prompt, for example using a depth-and-edge-aware diffusion model for generation of 3D textures. This may provide a technical advantage by providing a way to generate a high quality 3D texture for a 3D mesh that takes into account some features (e.g., edges) of an existing 3D texture. The use of attention guidance, in some examples, may provide a technical advantage in that the generated 3D texture is consistent for different views, thus providing a higher quality and/or more realistic 3D texture. In some examples, multi-conditioned classifier-free guidance may be used, which may provide a technical advantage in that the generated 3D texture has less blurring and more high frequency details.

In an example aspect, a method is disclosed for generating a 3D texture for a 3D object, the method including: obtaining a 3D mesh representing the 3D object and a text prompt representing a desired texture; performing a sequence of texture sampling steps, wherein each given texture sampling step comprises: iterating over a plurality of 2D views of the 3D mesh to generate an intermediate texture map, wherein for a given iteration corresponding to a given 2D view of the plurality of 2D views the given 2D view and the text prompt are processed using a pre-trained 2D image generation diffusion model to fill in a portion of an intermediate texture map based on the given 2D view; and refining a noise estimation generated by the diffusion model, adding the intermediate texture map as guidance, to generate a latent variable to be inputted to a subsequent texture sampling step other than a final texture sampling step. The method also includes: outputting the intermediate texture map generated at the final texture sampling step as a final texture map representing the 3D texture; and applying the final texture map to the 3D mesh to output a textured 3D object having the desired texture.

In an example of the preceding example aspect, the given iteration corresponding to the given 2D view may include: obtaining a partially filled in intermediate texture map from a previous iteration corresponding to a previous 2D view of the plurality of 2D views; obtaining a previous latent variable corresponding to the given 2D view generated by a previous texture sampling step; and processing the previous latent variable, the given 2D view and the text prompt using the diffusion model with attention guidance based on the partially filled in intermediate texture map to generate the noise estimation.

In an example of the preceding example aspect, the given iteration corresponding to the given 2D view may further include: computing a denoised observation based on the noise estimation and the previous latent variable to fill in the portion of the intermediate texture map based on the given 2D view.

In an example of the preceding example aspect, the partially filled in intermediate texture map may be encoded from an image space to a latent space to provide the attention guidance to the diffusion model, and the denoised observation may be decoded from the latent space to the image space to fill in the portion of the intermediate texture map based on the given 2D view.

In an example of any of the preceding example aspects, refining the noise estimation may include: computing a texture noise using the intermediate texture map; combining the noise estimation and the texture noise using a multi-conditioned classifier-free guidance to obtain an updated noise estimation; and generating the latent variable using the updated noise estimation.

In an example of the preceding example aspect, the intermediate texture map may be encoded from an image space to a latent space to compute the texture noise.

In an example of the preceding example aspect, the diffusion model may be a depth-aware diffusion model that has been pre-trained to generate 2D images based on text prompts.

In an example of the preceding example aspect, the diffusion model may be a depth-and-edge-aware diffusion model that has been pre-trained to generate 2D images based on text prompts.

In another example aspect, a computer system is disclosed for generating a 3D texture for a 3D object, the system including a processing device configured to execute instructions to cause the system to perform any of the methods disclosed herein. This includes executing instructions to cause the system to obtain a 3D mesh representing the 3D object and a text prompt representing a desired texture; perform a sequence of texture sampling steps, wherein each given texture sampling step comprises: iterating over a plurality of 2D views of the 3D mesh to generate an intermediate texture map, wherein for a given iteration corresponding to a given 2D view of the plurality of 2D views the given 2D view and the text prompt are processed using a pre-trained 2D image generation diffusion model to fill in a portion of an intermediate texture map based on the given 2D view; and refining a noise estimation generated by the diffusion model, adding the intermediate texture map as guidance, to generate a latent variable to be inputted to a subsequent texture sampling step other than a final texture sampling step. The system is also caused to: output the intermediate texture map generated at the final texture sampling step as a final texture map representing the 3D texture; and apply the final texture map to the 3D mesh to output a textured 3D object having the desired texture.

In an example of the preceding example aspect, the processing device may be configured to execute instructions to cause the system to carry out the given iteration corresponding to the given 2D view by: obtaining a partially filled in intermediate texture map from a previous iteration corresponding to a previous 2D view of the plurality of 2D views; obtaining a previous latent variable corresponding to the given 2D view generated by a previous texture sampling step; and processing the previous latent variable, the given 2D view and the text prompt using the diffusion model with attention guidance based on the partially filled in intermediate texture map to generate the noise estimation.

In an example of the preceding example aspect, the processing device may be configured to execute instructions to cause the system to further carry out the given iteration corresponding to the given 2D view by: computing a denoised observation based on the noise estimation and the previous latent variable to fill in the portion of the intermediate texture map based on the given 2D view.

In an example of the preceding example aspect, the partially filled in intermediate texture map may be encoded from an image space to a latent space to provide the attention guidance to the diffusion model, and the denoised observation may be decoded from the latent space to the image space to fill in the portion of the intermediate texture map based on the given 2D view.

In an example of some of the preceding example aspects, the processing device may be configured to execute instructions to cause the system to refine the noise estimation by: computing a texture noise using the intermediate texture map; combining the noise estimation and the texture noise using a multi-conditioned classifier-free guidance to obtain an updated noise estimation; and generating the latent variable using the updated noise estimation.

In an example of the preceding example aspect, the intermediate texture map may be encoded from an image space to a latent space to compute the texture noise.

In an example of the preceding example aspect, the diffusion model may be a depth-aware diffusion model that has been pre-trained to generate 2D images based on text prompts.

In an example of the preceding example aspect, the diffusion model may be a depth-and-edge-aware diffusion model that has been pre-trained to generate 2D images based on text prompts, and edge information extracted from an existing texture of the 3D mesh may be provided as input.

In another example aspect, a non-transitory computer readable medium is disclosed that stores instructions that configure a computer system to perform the method of one or more of the preceding aspects.

BRIEF DESCRIPTION OF THE DRAWINGS

Reference will now be made, by way of example, to the accompanying drawings which show example embodiments of the present application, and in which:

FIG. 4 is a flowchart illustrating an example method for generating a 3D texture for a 3D mesh, in accordance with examples of the present disclosure.

Similar reference numerals may have been used in different figures to denote similar components.

DESCRIPTION OF EXAMPLE EMBODIMENTS

Examples described herein may be used to generate 3D textures for any arbitrary 3D mesh representing a 3D object, using a 2D image generation diffusion model (e.g., a pre-trained depth-aware and/or edge-aware diffusion model). Instead of generating 2D textures separately and combining the 2D textures to a 3D texture in a post-processing step, examples disclosed herein generate a 3D texture directly by generating a texture map (representing a 3D texture) that is progressively denoised over a sequence of texture sampling steps in a manner that avoids discrepancy between textures generated based on different 2D views of the 3D mesh.

Examples of the present disclosure may be adapted for texture editing, in which an existing 3D texture may be modified, based on a text prompt, while retaining some features (e.g., edges) of the existing 3D texture.

To assist in understanding the present disclosure, some discussion of diffusion models is first provided. Diffusion models have been of interest for generation of 2D images, particularly 2D image generation based on a text prompt.

A diffusion model is a type of latent variable generative model that is trained to learn a reverse diffusion process by which data that fits the distribution of a given dataset (on which the model has been trained) can be generated. A diffusion model may be implemented using a neural network with trainable parameters (also referred to as the weights of the neural network). During training, noise is successively added to training data over multiple steps, and the model is trained (e.g., using suitable neural network training algorithms) to learn how to recover the training data by reversing the noising process (i.e., using a denoising process). Then the trained diffusion model can be used to generate new data samples that fall within the distribution of the training dataset by applying the learned denoising process to random noise as input.

Figure 1:
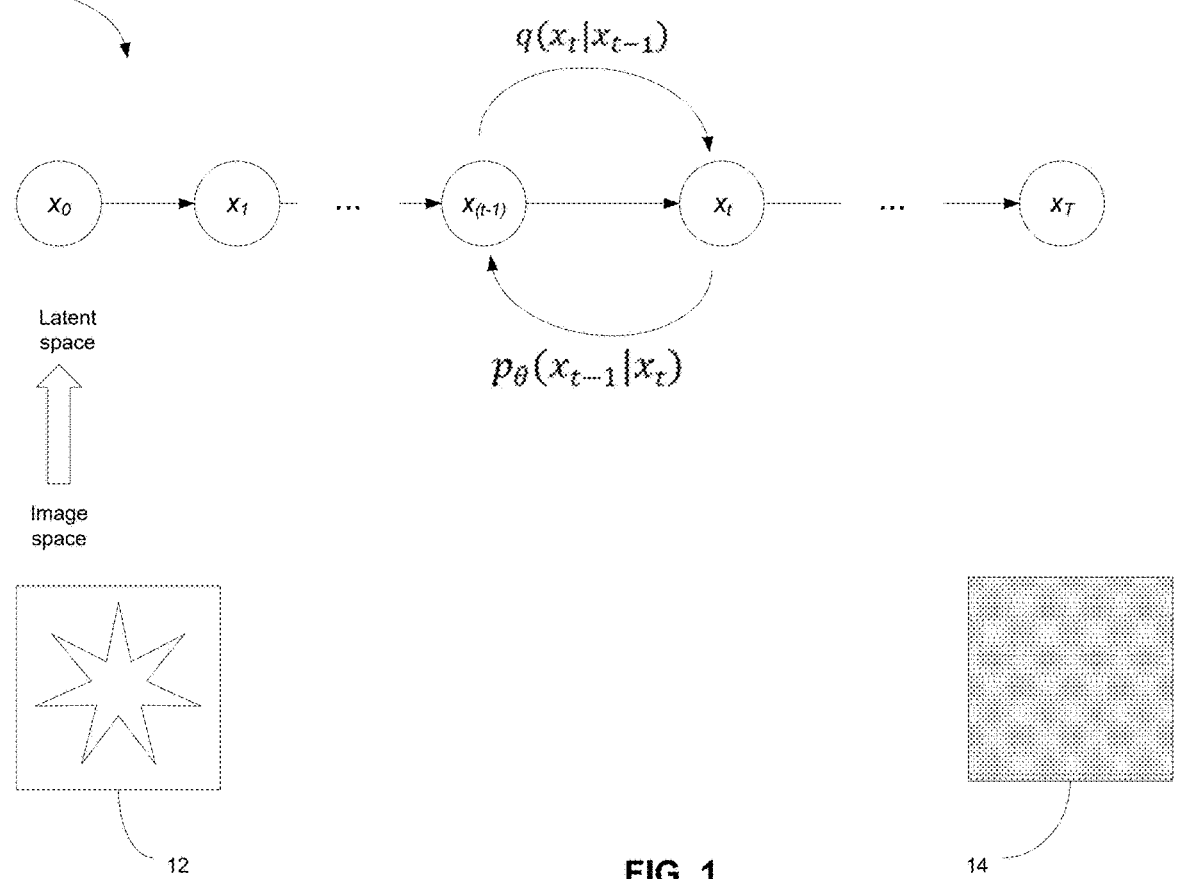
FIG. 1 is diagram illustrating an example Markov chain representing the training of a diffusion model.

FIG. 1 illustrates an example Markov chain 10 representing the noising process used to train a diffusion model. The training data is an image 12 that is in an image space (e.g., RGB space, in the case of an RGB image). The diffusion model is trained and operates on a latent variable, denoted x, that represents the image 12 in a latent space (e.g., represents certain latent features of the image 12). The latent variable may also be referred to as a hidden state, and contains information that is computed by the diffusion model but is not necessarily meaningful to humans. The image 12 may be transformed from the image space to the into the latent variable $x_0$ in the latent space (e.g., using an encoder of a variational autoencoder, for example).

The original image 12 is encoded to the latent variable $x_0$, which is inputted at step 1 of the Markov chain 10. At each step, random noise (e.g., Gaussian noise) is added. Thus, the output at step 1 of the noising process is a latent variable $x_1$, which is a latent representation of a slightly noised version of the original image. The noising process continues until the image 12 has been transformed into pure noise 14 (represented by the latent variable $x_T$) at the output of step T. The transition at step t from the latent variable $x_{(t-1)}$ to the latent variable $x_t$ can be modeled as the probability $q(x_t|x_{t-1})$. The goal of training the diffusion model is to enable the trained diffusion model to traverse the Markov chain 10 in reverse. This means that the diffusion model is trained to learn the reverse probability $p_\theta(x_{t-1}|x_t)$, where $\theta$ denotes the trainable parameters (e.g., neural network weights) of the diffusion model. Further details of diffusion models and their training may be found in Ho et al. (arXiv: 2006.11239v2) for example, incorporated herein by reference in its entirety.

The convention for describing the operation of a trained diffusion model is that the model starts at step T and proceeds "backwards" until a latent variable $x_0$, representing a noise-free image, is generated as the output of step 1. Each step may be understood to denoise the latent variable x by removing some amount of predicted noise, usually denoted $\epsilon$. The final latent variable $x_0$ (in the latent space) may then be transformed to the image space (e.g., decoded using a decoder of a variational autoencoder) to obtain the noise-free image (in the image space, or more specifically the RGB space in the case of an RGB image) that has been generated by the diffusion model. Thus, step 1 refers to the final step and the index 0 (e.g., as found in the subscript in $x_0$) refers to final output. In some examples, the step index may be referred to as a time step, however it should be understood that in such examples "time" refers to an index that is being traversed in reverse (i.e., decreasing) order.

As mentioned previously, diffusion models have been of interest for generation of 2D images based on text prompts. Such diffusion models may be referred to text-to-image (T2I) generators. T2I generations have been successful in generating 2D images based on text prompts.

However, the generation of 3D assets still faces challenges due to the limited size of 3D datasets, characterized by overly simplified textures. To this end, some existing methods have been harnessing the visual information encoded in the image priors of pre-trained T2I diffusion models. In the present disclosure, a "prior" refers to a model that has been pre-trained to capture prior knowledge, for example a pre-trained image generation diffusion model.

Some existing approaches, such as score distillation sampling (SDS) and variational score distillation (VSD), aim to distil the diffusion priors as score functions to optimize a 3D representation, ensuring that its rendered outputs align well with the high-likelihood image priors. However, there are drawbacks to such approaches. SDS and VSD are based on generation of 2D textures for different views of a 3D model, that are subsequently combined to obtain a 3D texture. 2D textures generated for different views of a 3D model may have inconsistencies that, when combined and optimized into a single 3D texture, may result in artifacts. For example, 3D textures generated using score distillation pipelines tend to exhibit over-saturation.

Some other existing approaches for texture synthesis involves directly utilizing the image sampling process of diffusion models to generate multiple 2D images over different 2D views. Some existing approaches adapt an image inpainting pipeline to progressively aggregate the 2D images generated from T2I models across different views onto a 3D texture map. However, such approaches often result in noticeable seams on the aggregated texture map, stemming mainly from the error accumulation during the autoregressive view inpainting process.

Thus, existing methods for generation of a 3D texture for a 3D model suffer from various drawbacks.

The present disclosure describes examples for generating 3D textures for 3D models using pre-trained latent diffusion models. In examples described below, a view-consistent texture map (i.e., a texture map that avoids inconsistencies between two different views of the 3D model, such as a left view being a darker shade than a right view) is built up in an image space (or more specifically RGB space, in the case of an RGB texture). The texture map is updated at each texture sampling step to gradually reveal texture details over a sequence of steps.

Figure 2:
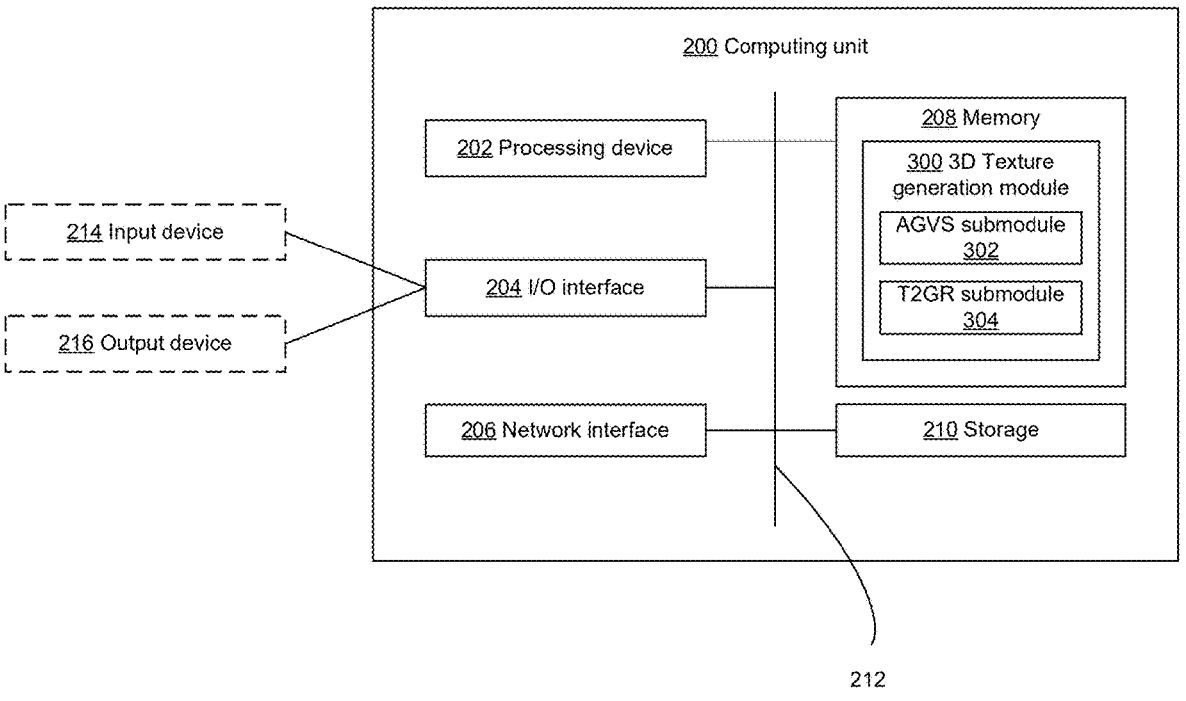
FIG. 2 is a block diagram of an example computing unit, which may be used to implement examples of the present disclosure.

FIG. 2 is a block diagram of an example computing unit 200, which may be used to implement examples disclosed herein. For example, a 3D texture generation module as disclosed herein may be implemented using the computing unit 200 of FIG. 2. The computing unit 200 may be embodied as a computing device (e.g., a server, a desktop computer, a workstation, etc.) or may be embodied as a component of a computing device, to execute machine executable instructions to carry out examples disclosed herein. Other computing units or processing units suitable for implementing embodiments described in the present disclosure may be used, which may include components different from those discussed below.

The computing unit 200 includes at least one processing device 202, which is a hardware device such as a processor, a microprocessor, a central processing unit (CPU), a graphics processing unit (GPU), a tensor processing unit (TPU), a neural processing unit (NPU), a hardware accelerator, an application-specific integrated circuit (ASIC), a field-programmable gate array (FPGA), a dedicated logic circuitry, or combinations thereof. The computing unit 200 may include at least one input/output (I/O) interface 204, which may enable interfacing with one or more optional input devices 214 (e.g., physical buttons, keyboard, mouse, touchscreen, microphone, etc.) and/or output devices 216 (e.g., display, speaker, haptic unit, etc.). In this example, the optional input and output devices 214, 216 are shown as external to the computing unit 200; in other examples, one or more input and/or output devices 214, 216 may be an internal component of the computing unit 200.

The computing unit 200 may also include at least one network interface 206 for wired and/or wireless communications with an external system and/or network (e.g., an intranet, the Internet, a P2P network, a WAN and/or a LAN). A network interface may enable the computing unit 200 to carry out communications (e.g., wireless communications) with systems external to the computing unit 200, such as to receive inputs from and provide outputs to an external client device.

The computing unit 200 includes at least one physical memory 208, which may include a volatile or non-volatile memory (e.g., a flash memory, a random access memory (RAM), and/or a read-only memory (ROM)). The memory 208 may store instructions for execution by the processing device 202, to cause the computing unit 200 to carry out examples of the methods, functionalities, systems and modules disclosed herein. The memory 208 may include other software instructions, such as instructions for implementing an operating system and other applications/functions.

The memory 208 may, for example, store instructions for implementing a 3D texture generation module 300 as disclosed herein. In this example, the 3D texture generation module 300 includes an attention-guided view sampling (AGVS) submodule 302 and a text & texture-guided resample (T2GR) submodule 304, the operations of which will be discussed with respect to FIGS. 3A-C below.

The computing unit 200 may also include a storage unit 210, which may include a mass storage unit such as a solid state drive, a hard disk drive, a magnetic disk drive and/or an optical disk drive. The storage unit 210 may store data, such as learned parameters of a neural network (e.g., learned parameters of a neural network for implementing a trained image generation model, such as a pre-trained T2I diffusion model).

There may be a bus 212 providing communication among components of the computing unit 200, including the processing device 202, I/O interface 204, network interface 206, memory 208 and/or storage 210. The bus 212 may be any suitable bus architecture including, for example, a memory bus, a peripheral bus or a video bus.

Figure 3A:
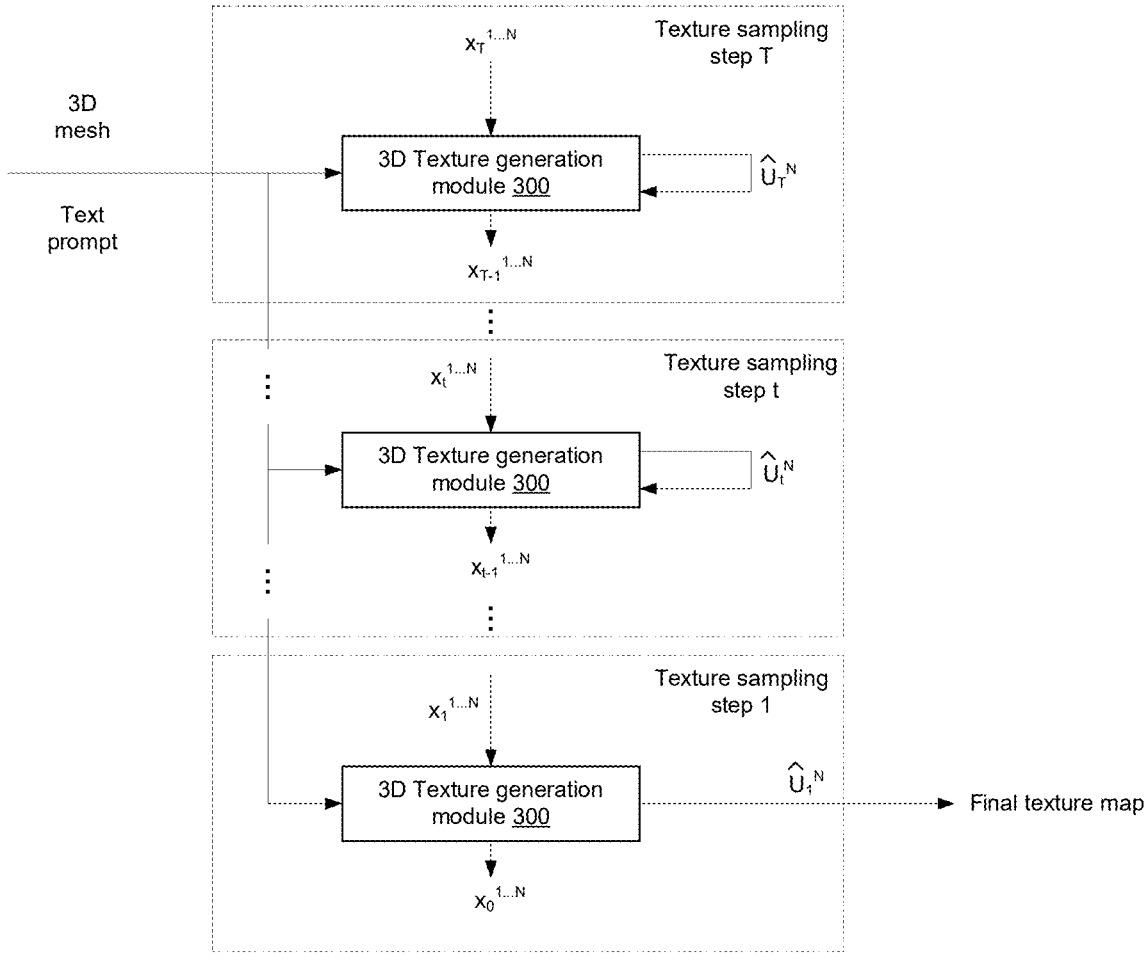
FIG. 3A is a block diagram illustrating an example operation of the 3D texture generation module of FIG. 2 for generating a 3D texture for a 3D mesh over a sequence of texture sampling steps, in accordance with examples of the present disclosure.

FIG. 3A is a block diagram illustrating the operations of an example 3D texture generation module 300 for generating a 3D texture for an arbitrary 3D mesh over multiple texture sampling steps. It should be understood that the multiple instances of the 3D texture generation module 300 shown in FIG. 3A illustrates the operation of the 3D texture generation module 300 over a sequence of steps and not the use of multiple 3D texture generation modules 300.

Rather than generating 2D textures separately and combining them together into a 3D texture in a post-processing step, as in some existing approaches, the 3D texture generation module 300 and methods disclosed herein enable direct generation of a complete 3D texture at each texture sampling step. The 3D texture may be generated in the form of a UV texture map in the RGB space. A UV texture map may be thought of as a 2D representation of a 3D texture, where each vertex of a 3D mesh corresponds to a coordinate (or a pixel) of the UV texture map. The 3D texture can be applied to each face of the 3D mesh by applying the RGB texture contained in corresponding coordinates of the UV texture map.

The 3D texture generation module 300 makes use of a pre-trained 2D diffusion model, which has been trained for text-prompted image generation. For example, the depth-aware diffusion model described by Zhang et al. (*Proceedings of the IEEE/CVF International Conference on Computer Vision,* 2023, pp. 3836-3847, incorporated herein by reference) may be used as a pre-trained 2D diffusion model in some examples. Other stable diffusion-based image generation models with depth guidance may be used, such as the model described by Rombach et al. (*Proceedings of the IEEE/CVF Conference on Computer Vision and Pattern Recognition (CVPR),* 2022, pp. 10684-10695) As discussed with respect to FIG. 1, a diffusion model that has been trained for image generation operates over a plurality of steps to generate an image by predicting noise to be removed from a latent variable at each step, then decoding the final latent variable into the final noise-free image. This process is adapted for generating a 3D texture, as disclosed herein. A 3D texture is generated over a sequence of texture sampling steps progressing from step T to step 1, where the final texture map (representing the final 3D texture) is obtained at step 1.

As shown in FIG. 3A, the generation of the final 3D texture, in the form of a UV texture map denoted $$\hat{U}_1^N,$$

involves a sequence of texture sampling steps (also referred to as denoising steps). At each texture sampling step, the 3D mesh for which the 3D texture is to be generated is provided as input to the 3D texture generation module 300, together with a text prompt (e.g., a natural language description of the desired texture). The text prompt may be text input provided by a user, text converted from voice input provided by user, etc. The 3D texture generation module 300 also receives as input the latent variable, denoted $$x_t^{1\ldots N},$$

from the previous texture sampling step, where the subscript t denotes the current texture sampling step and the superscript 1 . . . N denotes the N views of the 3D mesh that are sampled to generate the 3D texture (e.g., 8 views may be sampled around the object, such as top and bottom views as well as 6 uniformly sampled side views; it should be understood that a greater or fewer number of views may be used). For the first texture sample step T, the input latent variable $$x_T^{1\ldots N}$$

may be random noise.

At a given texture sampling step t, the input latent variable is $$x_t^{1\ldots N}.$$

The 3D texture generation module 300 predicts, using a pre-trained 2D diffusion model, the estimated noise to be removed from the latent variable over the N sequentially sampled 2D views around the 3D mesh. Based on the sampling process of denoising diffusion implicit models (DDIM), the 3D texture generation module 300 additionally generated, for each latent variable $$x_t^i,$$

a prediction of the final latent variable, referred to as a "denoised observation" of $$x_t^i.$$

The denoised observation of $$x_t^i$$

is denoted as $$\hat{x}_0^i(x_t^i),$$

and represents an estimate of what the final latent variable might be, based on the current latent variable. The N denoised observations collected over the N different views may be decoded into the RGB space and assembled to generate an estimate of the final texture map, referred to as an intermediate texture map. The intermediate texture map may be denoted $$\hat{U}_t^N,$$

where the subscript t denotes the current texture sampling step and the superscript N denotes the number of views. The intermediate texture map is inputted back into the 3D texture generation module 300 to refine the noise estimation, then the updated noise estimation is used to compute the output latent variable $$x_{t-1}^{1\ldots N}.$$

At the final texture sampling step 1, the final texture map, denoted $$\hat{U}_1^N,$$

is generated as output. The final texture map may be applied to the 3D mesh to obtain the textured 3D mesh, which is texture in accordance with the text prompt. The final output latent variable $$x_0^{1\ldots N}$$

may be discarded. In this way, a 3D texture can be directly generated for any arbitrary 3D mesh and text prompt, without the need for further optimization or processing steps to assemble 2D textures onto the 3D mesh.

Further details of the texture sampling step is discussed below with reference to FIG. 3B.

Figure 3B:
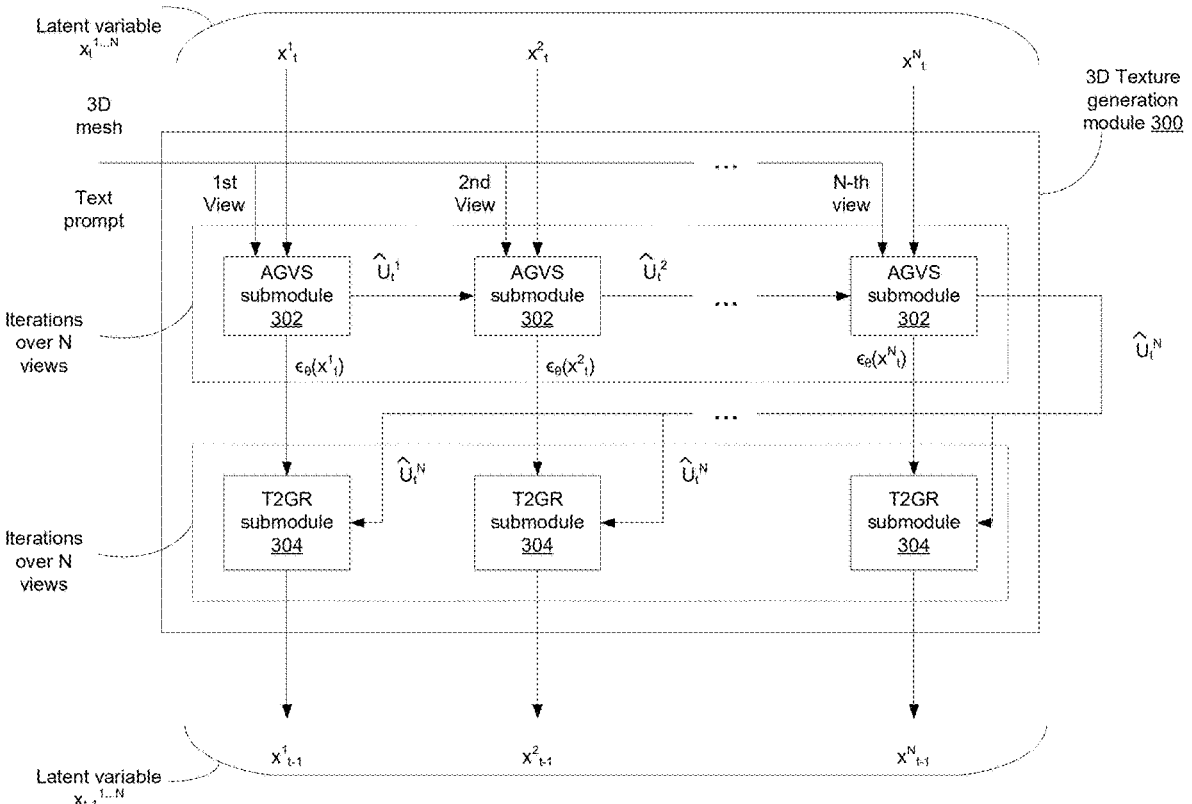
FIG. 3B is a block diagram illustrating an example operation of the 3D texture generation module of FIG. 3A at one texture sampling step, including iterations over multiple different views of the 3D mesh, in accordance with examples of the present disclosure.

FIG. 3B is a block diagram of an example 3D texture generation module 300, illustrating example operations for a single texture sampling step at step index t (where t is an arbitrary step between the first step T and the last step 1). The texture sampling step at step index t involves iterations performed over a plurality of sampled 2D views of the 3D mesh (e.g., denoted as N views). FIG. 3B illustrates multiple instances of the AGVS submodule 302 and multiple instances of the T2GR submodule 304, to illustrate the operations of the submodules 302, 304 iterated over N different views, however this is not intended to indicate that implementation of the 3D texture generation module 300 requires multiple instances of the submodules 302, 304 (although such an embodiment may also be within the scope of the present disclosure). There may be a single instance of the AGVS submodule 302 and a single instance of the T2GR submodule 304, which may be used to iterate over N views, and over multiple texture sampling steps.

The AGVS submodule 302 uses an attention-guided multi-view sampling approach to help ensure better consistency in the texture generated over the N views within one texture sampling step. The T2GR submodule 304 uses an approach for noise estimation that makes use of lower-frequency information from the intermediate texture map generated at one texture sampling step as well as higher-frequency information generated by the 2D diffusion model in order to refine the latent variable.

At a texture sampling step t, the 3D texture generation module 300 obtains N different views of the 3D mesh (where each of the N views is a different 2D view of the 3D mesh). The N views may have been sampled at some initial step (e.g., at or prior to the first texture sampling step T) and should cover all surfaces of the 3D mesh to be textured. The 3D texture generation module 300 receives the latent variable $$x_t^{1\ldots N}$$

that was generated from the prior texture sampling step. The latent variable $$x_t^{1\ldots N}$$

is a set of latent variables $$x_t^1 \text{ to } x_t^N,$$

where each $$x_t^i$$

contains latent features corresponding to the i-th view.

The AGVS submodule 302 receives the latent variable $$x_t^{1\ldots N}$$

US 12,675,938 B2

11 and iterates through the N views. At the i-th iteration (corresponding to the i-th view), the AGVS submodule 302 processes the latent variable $$x_t^i$$

with the i-th view of the 3D mesh and the text prompt, and also receives a partial texture map $$\hat{U}_t^{i-1}$$

generated by the previous iteration (i.e., corresponding to the (i-t)-th view). The partial texture map from the previous iteration is used to guide texture sampling for the current i-th iteration. In particular, the partial texture map is used for attention guidance such that the AGVS submodule 302 is guided to generate unfilled regions of the texture map while preserving the previously filled regions in the partial texture map. This attention guidance enables direction generation of a 3D textures in which partial textures generated in one view are consistent with textures generated in a different view. This approach helps to address the problem of artifacts such as over-smoothing and over-saturation encountered in approaches that use later processing to combine individual 2D textures into a 3D texture.

The AGVS submodule 302 then produces an updated partial texture map $$\hat{U}_t^i,$$

which adds texture sampled from the i-th view to the previous partial texture map $$\hat{U}_t^{i-1}.$$

The AGVS submodule 302 also outputs a noise estimation (denoted $$\epsilon_\theta(x_t^i)),$$

which is predicted by the diffusion model within the AGVS submodule 302 (discussed further below). If i is equal to 1 (i.e., the first iteration through the N views), the partial texture map $$\hat{U}_t^0$$

inputted to the AGVS submodule 302 may be empty. If i is equal to N (i.e., the final iteration through the N views), the texture map $$\hat{U}_t^N$$

12 outputted by the AGVS submodule 302 is a complete, intermediate texture map that provides a 3D texture over all views of the 3D mesh. The texture map $$\hat{U}_t^N$$

generated after N iterations performed by the AGVS submodule 302 is an intermediate texture map if the texture sampling step t is not the final step (i.e., t is not equal to 1). It should be noted that the intermediate texture map is a noise-free (but not yet final) texture map that is based on observations of the latent variable at a non-final step t. If the texture sampling step t is the final step (i.e., t is equal to 1), then the generated texture map $$\hat{U}_1^N$$

is the final texture map.

The T2GR submodule 304 uses the intermediate texture map $$\hat{U}_t^N$$

from the AGVS submodule 302 to refine the noise estimation for each of the N views. In particular, the T2GR submodule 304 iterates through the N views, where in each i-th iteration the T2GR submodule 304 receives the corresponding noise estimation $$\epsilon_\theta(x_t^i)$$

generated by the AGVS submodule 302 for that i-th view. The T2GR submodule 304 refines the noise estimation by combining the noise estimation from the AGVS submodule 302 (which typically contains higher-frequency noise), with noise estimated using the intermediate texture map (which typically contains lower-frequency noise). The refined noise estimation is then used to generate the latent variable $$x_{t-1}^i.$$

By iterating over all N views, the T2GR submodule 304 generates the latent variable $$x_{t-1}^{1...N}$$

that is used as input for the following texture sampling step (i.e., input to texture sampling step (t−1)).

Figure 3C:
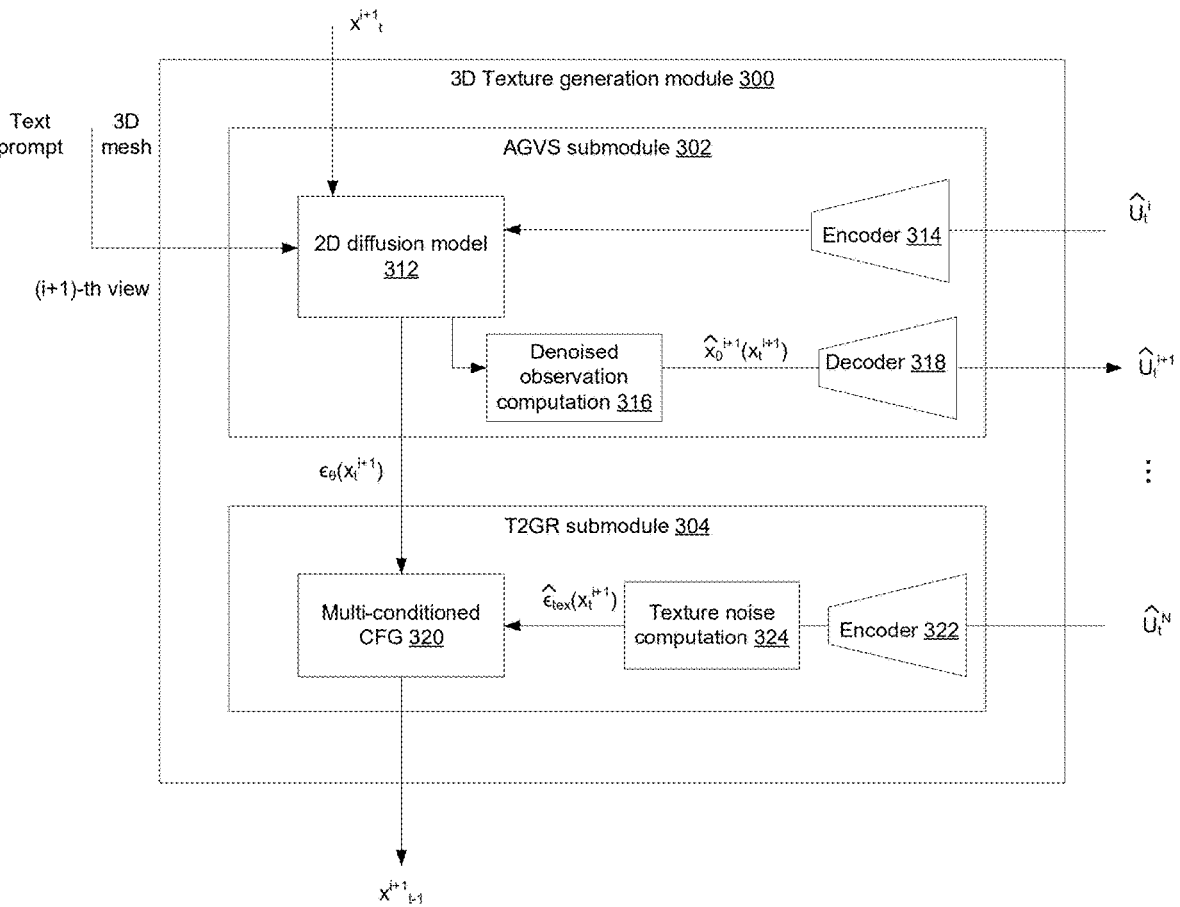
FIG. 3C is a block diagram illustrating an example operation of the 3D texture generation module of FIG. 3B at one view in one texture sampling step, in accordance with examples of the present disclosure.

Reference is now made to FIG. 3C, which shows example operations of the 3D texture generation module 300 for a given texture sampling step t, and for a given sampled view i+1.

The AGVS submodule 302 includes a pre-trained 2D image generation diffusion model 312, such as the depth-aware diffusion model described by Zhang et al. (previously incorporated by reference). The inputs to the 2D diffusion model 312 are the latent variable $$x_t^{i+1}$$

(from the output of the prior texture sampling step t−1), the (i+1)-th view of the 3D mesh and the text prompt. Additionally, the partial texture map $$\hat{U}_t^i$$

that has been filled in by the prior i iterations (over the prior 1 to i views) is rendered for the (i+1)-th view and encoded from the image space to the latent space by an encoder 314 (e.g., an encoder of a variational autoencoder that has been trained to encode and decode between the latent space and the image space) and is used to apply attention to unfilled portions of the intermediate map according to the following equation:

$$x_t^{i+1} \leftarrow x_t^{i+1} \odot M_\downarrow^{i+1} + \left(\sqrt{\alpha_t} \cdot G_t^{i+1} + \sqrt{1 - \alpha_t} \cdot \epsilon\right) \odot \left(1 - M_\downarrow^{i+1}\right)$$

where $\alpha_t$ is a hyperparameter that is the total noise variance parameterized by t, $$G_t^{i+1}$$

denotes the latent features encoded (using the encoder 314) from the partial texture map $$\hat{U}_t^i, M^{i+1}$$

denotes a mask delineating unfilled regions of the texture map and the $\downarrow$ symbolizes downsampling to the resolution of latent features.

At the 2D diffusion model 312, a self-attention module is used to ensure consistency of textures between views. The self-attention module may be based on the self-attention module described by Cao et al. ("MasaCtrl: Tuning-Free Mutual Self-Attention Control for Consistent Image Synthesis and Editing", arXiv:2304.08465, 2023), but adapted for generation of textures as disclosed herein. Rather than utilizing only Key and Value features of the current view as in conventional self-attention approaches, the self-attention module used in the disclosed example replaces the Key and Value features of the current view with Key and Value features from a reference view. The reference view may be the first of the N views (e.g., a front view of the 3D mesh), and the same reference view is used for generation of textures from all views. This enables generation of new textures at the (i+1)-th view that are consistent with textures previously generated from the prior 1 to i views.

The output from the 2D diffusion model 312 is the estimated noise $$\epsilon_\theta\left(x_t^{i+1}\right).$$

The estimated noise is provided as input to a denoised observation computation block 316. At the denoised observation computation block 316, the denoised observation for the (i+1)-th view, denoted $$\hat{x}_0^{i+1}\left(x_t^{i+1}\right),$$

may be computed according to the following equation:

$$\hat{x}_0^{i+1}\left(x_t^{i+1}\right) = \frac{x_t^{i+1} - \sqrt{1 - \alpha_t} \cdot \epsilon_\theta\left(x_t^{i+1}\right)}{\sqrt{\alpha_t}}$$

As shown in FIG. 3C, this denoised observation is then decoded, using a decoder 318 (e.g., a decoder of the variational autoencoder that has been trained to encode and decode between the latent space and the image space), to obtain the partial texture map $$\hat{U}_t^{i+1}$$

that contains textures generated from views 1 to (i+1).

The T2GR submodule 304 performs operations to refine the latent variable that will be used as input to the next texture sampling step. The use of the T2GR submodule 304 enables refinement of details in the intermediate texture map. In particular, the T2GR submodule 304 performs operations to update the estimated noise (outputted by the 2D diffusion model 312) using the intermediate texture map as guidance.

The estimated noise $$\epsilon_\theta\left(x_t^{i+1}\right)$$

is provided to a multi-conditioned classifier-free guidance (CFG) 320 of the T2GR submodule 304. Additionally, the intermediate texture map $$\hat{U}_t^N,$$

which has been completed by the AGVS submodule 302 over N iterations (i.e., over the views 1 to N) is also provided to the T2GR submodule 304.

The intermediate texture map is rendered for the (i+1)-th view and encoded from the image space to the latent space by an encoder 322 (e.g., an encoder of a variational autoencoder that has been trained to encode and decode between the latent space and the image space), then inputted to a texture noise computation block 324. The texture noise computation block 324 computes a texture noise, denoted $$\hat{\epsilon}_{tex}\left(x_t^{i+1}\right),$$

based on the intermediate texture, according to the following equation:

$$\hat{\varepsilon}_{tex}\left(x_t^{i+1}\right) = \frac{x_t^{i+1} - \sqrt{\alpha_t} \cdot \varepsilon\left(\mathrm{Render}^{i+1}(\hat{U}_t^N)\right)}{\sqrt{1-\alpha_t}}$$

where $$\mathrm{Render}^{i+1}(\hat{U}_t^N)$$

denotes the rendering of the intermediate texture map for the (i+1)-th view, and where ε denotes the encoding performed by the encoder 322.

The texture noise, which typically contains lower-frequency noise compared to the estimated noise from the 2D diffusion model, is also provided to the multi-conditioned CFG 320. The multi-conditioned CFG 320 may, for example, be based on the approach described by Brooks et al. ("InstructPix2Pix: Learning to Follow Image Editing Instructions", *arXiv:2211.09800*, 2022 Nov. 17). The multi-conditioned CFG 320 enables the noise estimation outputted from the 2D diffusion model to be conditioned on the text prompt, a null-text prompt and the intermediate texture map. The multi-conditioned CFG 320 generates an updated noise estimation that is based on a combination of both the texture noise and the estimated noise from the 2D diffusion model, conditioned on the text prompt and a null prompt. It is this updated noise estimation that is used to compute the latent variable $$x_{t-1}^{i+1}$$

to be used as input at the next texture sampling step, according to the following equation:

$$x_{t-1}^{i+1} = \sqrt{\alpha_{t-1}-1} \cdot \hat{x}_0^{i+1}\left(x_t^{i+1}\right) + \sqrt{1-\alpha_{t-1}} \cdot \epsilon_m\left(x_t^{i+1}\right)$$

where $$\epsilon_m\left(x_t^{i+1}\right)$$

denotes the updated noise estimation generated by the multi-conditioned CFG 320.

It may be noted that the operations of the T2GR submodule 304 are performed over all views 1 to N.

At the final texture sampling step (i.e., step 1), the texture map $$\hat{U}_1^N$$

that is generated by the AGVS submodule 302 after iterating over views 1 to N is the final texture map that is outputted by the 3D texture generation module 300. Since the latent variable is no longer needed after the final texture sampling step, the T2GR submodule 304 need not be executed for the final texture sampling step.

Reference is now made to FIG. 4, which shows a flow-chart for an example method 400 for generating a 3D texture for a 3D model. The method 400 may be performed by a computing system (e.g., a computing system including the computing unit 200 of FIG. 2) having a processing device (e.g., a hardware processor) for executing instructions to carry out operations of the 3D texture generation module 300 disclosed herein.

At 402, a 3D mesh is obtained that represents a 3D object for which a 3D texture is to be generated. The 3D mesh may be any suitable 3D mesh, for example any suitable polygon mesh that is a collection of any suitable polygons (e.g., triangles, quadrilaterals, etc.). In some examples, a plurality of 2D views of the 3D mesh may be obtained at this step. The plurality of 2D views should be sufficient to cover all surfaces of the 3D mesh to which the 3D texture is to be applied. The plurality of 2D views may be obtained using any suitable method to sample or render 2D views from a 3D mesh.

At 404, a text prompt is obtained that describes a desired texture. The text prompt may be a natural language prompt, for example. For example, the text prompt may be manually created and provided as text input, the text prompt may be text converted from a voice input, the text prompt may be internally generated by the computing system, or the text prompt may be provided via an external computing system, among other possibilities.

At 406, a sequence of texture sampling steps is performed, wherein an intermediate texture map is generated at each texture sampling step. As described above, each texture sampling step includes performing iterations over the plurality of 2D views sampled over the 3D mesh. Each texture sampling step includes performing the operations 408 (e.g., using the AGVS submodule 302 of the 3D texture generation module 300) and 410 (e.g., using the T2GR submodule 304 of the 3D texture generation module 300), with the exception of the final texture sampling step which may optionally omit the operation 410.

The input to each texture sampling step is a latent variable outputted by the previous texture sampling step in the sequence of texture sampling steps, with the exception of the first texture sampling step where the input may be random noise (or a randomly initiated latent variable). The output of each texture sampling step is a latent variable that is used as input to a subsequent texture sampling step in the sequence of texture sampling steps, with the exception of the last texture sampling step where the outputted latent variable may be discarded.

At 408, an intermediate texture map is generated by iterating over the plurality of 2D views of the 3D mesh. Each iteration corresponds to a respective 2D view. An intermediate texture map is gradually filled in over the iterations. Each iteration is passed the partially filled in intermediate texture map from a previous iteration, with the exception that the first iteration (i.e., corresponding to the first view of the plurality of 2D views) starts with an empty intermediate texture map, and the intermediate texture map generated by the last iteration (i.e., corresponding to the last view of the plurality of 2D views) is completely filled in.

At a given iteration corresponding to a given 2D view, a trained image generation diffusion model (e.g., any suitable pre-trained T2I 2D image generation diffusion model) is used to fill in a portion of the intermediate texture map based on the given 2D view and in accordance with the text prompt. As discussed above, the partial intermediate texture map from a prior iteration is used to guide the texture generation in order to ensure consistency of the generated texture between views.

The filled in intermediate texture map and the noise estimation generated by the diffusion model are generated by the operation 408. As discussed above, the intermediate texture map may be used to compute a texture noise, which contains lower-frequency noise compared to the noise estimation generated by the diffusion model. The texture noise and the noise estimation from the diffusion model are combined (e.g., using the multi-conditioned CFG 320) to obtain an updated noise estimation, which is used to compute the output latent variable. This latent variable will be used as input to a subsequent texture sampling step in the sequence of texture sampling steps.

Operations 408-410 are performed for a defined number of texture sampling steps.

At 412, the intermediate texture map generated at by a final texture sampling step is outputted at the final texture map.

At 414, the final texture map is applied to the 3D mesh, using any suitable technique, to obtain a textured 3D object having the desired texture.

At 410, the noise estimation generated by the diffusion model is refined, with the intermediate texture map (generated at the operation 408) being added as guidance (in addition to text guidance), for example using the self-attention module as discussed above.

In some examples, the 3D texture generation module 300 and the method 400 may be used to edit an existing 3D texture, based on a text prompt. This may be done by using an edge-aware pre-trained diffusion model in the AGVS submodule 302. For example, the model described by Zhang et al. (previously incorporated by reference) has a depth-aware version as well as an edge-aware version, and these versions may be combined to obtain a depth-and-edge aware diffusion model, which may be used as the 2D diffusion model in the AGVS submodule 302. Edges may be extracted from the existing 3D texture and the edges may be provided as input to the 3D texture generation module 300 together with the 3D mesh and the text prompt. Then the edges corresponding to a given 2D view may be provided as input to the edge-aware diffusion model such that, by iterating over a plurality of 2D views, an edited 3D texture is generated that preserves the edges of the existing 3D texture, thus preserving some features of the existing 3D texture rather than generating an entirely new 3D texture. The operation of the 3D texture generation module 300 for texture editing may be similar to the operation described above for texture generation.

In various examples, the present disclosure has described methods, systems and computer readable media that enable text-guided generation of 3D textures using a 2D-based image generation model (e.g., a diffusion model). Examples of the present disclosure may enable generation of high-fidelity, photo-realistic 3D textures conditioned on a natural language text prompt. The generated 3D textures may be relatively free of artifacts such as over-saturation or over-smoothing, and may also be free of artifacts such as visible seams or cracks in the texture.

Examples of the present disclosure may enable text-driven editing of an existing texture in a manner that preserves some structural or appearance quality (e.g., edges) of the existing texture.

Examples of the present disclosure may be deployed in real-world 3D model texture generation applications. For example, given any arbitrary 3D mesh of a 3D object and a text prompt, examples of the present disclosure may enable output of a 3D texture for the 3D mesh, where the 3D texture matches the text prompt and is relatively free of artifacts. The quality of the generated 3D texture may be invariant to the resolution of the input 3D mesh. Examples of the present disclosure may find practical application in, for example, generation of 3D textures for VR or AR applications, gaming applications, online shopping applications, computer animation applications, 3D simulation applications, etc.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer such elements/components. For example, although any of the elements/components disclosed may be referenced as being singular, the embodiments disclosed herein could be modified to include a plurality of such elements/components. The subject matter described herein intends to cover and embrace all suitable changes in technology.

The content of any publications identified in this disclosure are incorporated herein by reference in their entirety.

The invention claimed is:

1. A method for generating a 3D texture for a 3D object, the method comprising:

obtaining a 3D mesh representing the 3D object and a text prompt representing a desired texture;

performing a sequence of texture sampling steps, wherein each given texture sampling step comprises:

iterating over a plurality of 2D views of the 3D mesh to generate an intermediate texture map, wherein, for a given iteration corresponding to a given 2D view of the plurality of 2D views, the given 2D view and the text prompt are processed using a pre-trained 2D image generation diffusion model to fill in a portion of an intermediate texture map based on the given 2D view; and refining a noise estimation generated by the diffusion model, adding the intermediate texture map as guidance, to generate a latent variable to be inputted to a subsequent texture sampling step other than a final texture sampling step, wherein refining the noise estimation includes:

computing a texture noise using the intermediate texture map;

combining the noise estimation and the texture noise using a multi-conditioned classifier-free guidance to obtain an updated noise estimation; and generating the latent variable using the updated noise estimation;

outputting the intermediate texture map generated at the final texture sampling step as a final texture map representing the 3D texture; and applying the final texture map to the 3D mesh to output a textured 3D object having the desired texture.

2. The method of claim 1, wherein the given iteration corresponding to the given 2D view comprises:

obtaining a partially filled in intermediate texture map from a previous iteration corresponding to a previous 2D view of the plurality of 2D views;

obtaining a previous latent variable corresponding to the given 2D view generated by a previous texture sampling step; and processing the previous latent variable, the given 2D view and the text prompt using the diffusion model with attention guidance based on the partially filled in intermediate texture map to generate the noise estimation.

3. The method of claim 2, wherein the given iteration corresponding to the given 2D view further comprises:

computing a denoised observation based on the noise estimation and the previous latent variable to fill in the portion of the intermediate texture map based on the given 2D view.

4. The method of claim 3, wherein the partially filled in intermediate texture map is encoded from an image space to a latent space to provide the attention guidance to the diffusion model, and wherein the denoised observation is decoded from the latent space to the image space to fill in the portion of the intermediate texture map based on the given 2D view.

5. The method of claim 1, wherein the intermediate texture map is encoded from an image space to a latent space to compute the texture noise.

6. The method of claim 1, wherein the diffusion model is a depth-aware diffusion model that has been pre-trained to generate 2D images based on text prompts.

7. The method of claim 1, wherein the diffusion model is a depth-and-edge-aware diffusion model that has been pre-trained to generate 2D images based on text prompts.

8. A computer system for generating a 3D texture for a 3D object, the system comprising:

a processing device configured to execute instructions to cause the system to:

obtain a 3D mesh representing the 3D object and a text prompt representing a desired texture;

perform a sequence of texture sampling steps, wherein each given texture sampling step comprises:

iterating over a plurality of 2D views of the 3D mesh to generate an intermediate texture map, wherein for a given iteration corresponding to a given 2D view of the plurality of 2D views the given 2D view and the text prompt are processed using a pre-trained 2D image generation diffusion model to fill in a portion of an intermediate texture map based on the given 2D view; and refining a noise estimation generated by the diffusion model, adding the intermediate texture map as guidance, to generate a latent variable to be inputted to a subsequent texture sampling step other than a final texture sampling step, wherein refining the noise estimation includes:

computing a texture noise using the intermediate texture map;

combining the noise estimation and the texture noise using a multi-conditioned classifier-free guidance to obtain an updated noise estimation; and generating the latent variable using the updated noise estimation;

output the intermediate texture map generated at the final texture sampling step as a final texture map representing the 3D texture; and apply the final texture map to the 3D mesh to output a textured 3D object having the desired texture.

9. The system of claim 8, wherein the processing device is configured to execute instructions to cause the system to carry out the given iteration corresponding to the given 2D view by:

obtaining a partially filled in intermediate texture map from a previous iteration corresponding to a previous 2D view of the plurality of 2D views;

obtaining a previous latent variable corresponding to the given 2D view generated by a previous texture sampling step; and processing the previous latent variable, the given 2D view and the text prompt using the diffusion model with attention guidance based on the partially filled in intermediate texture map to generate the noise estimation.

10. The system of claim 9, wherein the processing device is configured to execute instructions to cause the system to further carry out the given iteration corresponding to the given 2D view by:

computing a denoised observation based on the noise estimation and the previous latent variable to fill in the portion of the intermediate texture map based on the given 2D view.

11. The system of claim 10, wherein the partially filled in intermediate texture map is encoded from an image space to a latent space to provide the attention guidance to the diffusion model, and wherein the denoised observation is decoded from the latent space to the image space to fill in the portion of the intermediate texture map based on the given 2D view.

12. The system of claim 8, wherein the intermediate texture map is encoded from an image space to a latent space to compute the texture noise.

13. The system of claim 8, wherein the diffusion model is a depth-aware diffusion model that has been pre-trained to generate 2D images based on text prompts.

14. The system of claim 8, wherein the diffusion model is a depth-and-edge-aware diffusion model that has been pre-trained to generate 2D images based on text prompts.

15. A non-transitory computer readable medium storing instructions for configuring a computer system to generate a 3D texture for a 3D object by:

obtaining a 3D mesh representing the 3D object and a text prompt representing a desired texture;

performing a sequence of texture sampling steps, wherein each given texture sampling step comprises:

iterating over a plurality of 2D views of the 3D mesh to generate an intermediate texture map, wherein for a given iteration corresponding to a given 2D view of the plurality of 2D views the given 2D view and the text prompt are using processed a pre-trained 2D image generation diffusion model to fill in a portion of an intermediate texture map based on the given 2D view; and refining a noise estimation generated by the diffusion model, adding the intermediate texture map as guidance, to generate a latent variable to be inputted to a subsequent texture sampling step other than a final texture sampling step, wherein refining the noise estimation includes:

computing a texture noise using the intermediate texture map;

combining the noise estimation and the texture noise using a multi-conditioned classifier-free guidance to obtain an updated noise estimation; and generating the latent variable using the updated noise estimation;

outputting the intermediate texture map generated at the final texture sampling step as a final texture map representing the 3D texture; and applying the final texture map to the 3D mesh to output a textured 3D object having the desired texture.

16. The non-transitory computer readable medium of claim 15, wherein the given iteration corresponding to the given 2D view comprises:

obtaining a partially filled in intermediate texture map from a previous iteration corresponding to a previous 2D view of the plurality of 2D views;

obtaining a previous latent variable corresponding to the given 2D view generated by a previous texture sampling step; and processing the previous latent variable, the given 2D view and the text prompt using the diffusion model with attention guidance based on the partially filled in intermediate texture map to generate the noise estimation.

17. The non-transitory computer readable medium of claim 16, wherein the given iteration corresponding to the given 2D view further comprises:

computing a denoised observation based on the noise estimation and the previous latent variable to fill in the portion of the intermediate texture map based on the given 2D view.

18. The non-transitory computer readable medium of claim 17, wherein the partially filled in intermediate texture map is encoded from an image space to a latent space to provide the attention guidance to the diffusion model, and wherein the denoised observation is decoded from the latent space to the image space to fill in the portion of the intermediate texture map based on the given 2D view.

19. The non-transitory computer readable medium of claim 15, wherein the intermediate texture map is encoded from an image space to a latent space to compute the texture noise.

20. The non-transitory computer readable medium of claim 15, wherein the diffusion model is a depth-aware diffusion model or a depth-and-edge aware diffusion model that has been pre-trained to generate 2D images based on text prompts.

\* \* \* \* \*